United States Patent [19]

Johnson et al.

[11] Patent Number: 4,610,218
[45] Date of Patent: Sep. 9, 1986

[54] APPARATUS FOR INTIMATELY CONTACTING PARTICULATE SOLIDS WITH A HEAVY LIQUID

[75] Inventors: Steven W. Johnson, Plano; Alden W. Olsen, Allen, both of Tex.

[73] Assignee: Atlantic Richfield Company, Los Angeles, Calif.

[21] Appl. No.: 714,714

[22] Filed: Mar. 21, 1985

[51] Int. Cl.⁴ ...................... B05B 17/00; B05C 13/02
[52] U.S. Cl. .................................... 118/303; 118/326
[58] Field of Search ............................... 118/303, 326

[56] References Cited

U.S. PATENT DOCUMENTS

| | | | |
|---|---|---|---|
| 2,071,846 | 2/1937 | Lamb et al. | 118/303 |
| 2,097,914 | 11/1937 | Cooper et al. | 118/303 |
| 2,973,740 | 3/1961 | Hopkins et al. | 118/303 |
| 4,270,486 | 6/1981 | Leverenz | 118/303 |
| 4,369,689 | 1/1983 | Donaghue et al. | 118/303 |

*Primary Examiner*—Shrive P. Beck
*Attorney, Agent, or Firm*—F. Lindsey Scott

[57] ABSTRACT

An apparatus for intimately contacting particulate solids with a heavy liquid, said apparatus comprising:
(a) a contacting vessel;
(b) a particulate solids inlet in communication with an upper end of the contacting vessel;
(c) a generally conical deflector positioned in the contacting vessel beneath the particulate solids inlet;
(d) an inlet control to control the flow of the particulate solids into the contacting vessel and prevent the discharge of gaseous materials from the contacting vessel;
(e) a particulate solids outlet in communication with a lower end of the contacting vessel;
(f) an outlet control to control the flow of particulate solids from the contacting vessel so that a bed of particulate solids is maintained in a lower portion of the contacting vessel; and,
(g) spray nozzles positioned in the contacting vessel to spray heavy liquid onto the particulate solids as they fall downwardly to the bed of particulate solids.

The spray nozzles are positioned so that no spray is directed toward the inner walls of the contacting vessel.

8 Claims, 3 Drawing Figures

APPARATUS FOR INTIMATELY CONTACTING PARTICULATE SOLIDS WITH A HEAVY LIQUID

This invention relates to an apparatus for intimately contacting particulate solids with a heavy liquid.

This invention further relates to an apparatus for intimately contacting dried particulate low rank coal with a heavy oil.

In recent years, there has been considerable interest in the mining and use of low rank coal. Brown coal, lignite and subbituminous coals are generally considered to be lower rank coals with anthracite and bituminous coals being higher rank coals. While there has been considerable interest in mining and use of the lower rank coals as fuels because of their relatively low mining costs and because many of the lower rank coals have a relatively low sulfur and ash content, the use of such lower rank coals as a fuel has been greatly inhibited by the fact that as produced they typically contain a relatively high percentage of water. As a result, various processes have been developed to dry such lower rank coals to produce coals having a lower water content for use as a fuel. U.S. Pat. No. 4,354,825 issued Oct. 19, 1982 to Fisher, et al, and U.S. Pat. No. 4,396,394 issued Aug. 2, 1983 to Li, et al disclose two such processes and are hereby incorporated in their entirety by reference.

The dried coal produced by such processes frequently has a tendency to undergo spontaneous ignition and combustion in storage or in transit. Such dried low rank coals also frequently tend to generate large quantities of dust upon handling. Heavy oil compositions have been used to reduce the tendency of such dried low rank coals to spontaneously ignite and in some instances in an attempt to control the dusting tendencies of the low rank coal. Some such heavy oil compositions are shown in U.S. Pat. No. 4,201,657 issued May 6, 1980 to Anderson, et al and U.S. Pat. No. 4,402,707 issued Sept. 6, 1983 to Wunderlich, both of which are hereby incorporated in their entirety by reference.

In the treatment of such dried low rank coal with heavy oil, intimate contact between the heavy oil and the particulate coal is necessary to insure that uniform treatment of the particulate coal with the heavy oil is accomplished. Since the heavy oil may be viscous or solid at room temperature the accomplishment of intimate contact between the particulate coal and the heavy oil requires suitable apparatus. One such apparatus is disclosed in U.S. Pat. No. 4,396,395 issued Aug. 2, 1983 to Skinner, et al which is hereby incorporated in its entirety by reference. The disclosed apparatus has been found to be effective in the treatment of particulate coal with heavy oil.

In the treatment of particulate coal with heavy oil, it has been found that in many instances it is necessary to use air or some other carrier gas to assist in dispersing the heavy oil via spray systems to produce a mist of the heavy oil in a mist chamber or a mist zone through which the particulate coal falls. While the apparatus disclosed in U.S. Pat. No. 4,396,395 has been found effective for accomplishing intimate contact of heavy oil and particulate coal, the disclosure does not address the problems caused by the escape of the carrier gas from the contacting zone. The carrier gas contains entrained quantities of heavy oil mist and when exhausted from the contacting zone, constitutes an undesirable environmental polluant and represents the loss of a valuable process material, i.e., heavy oil. An improvement in apparatus of this type has been disclosed in U.S. Pat. No. 4,547,198 entitled "Method And Apparatus For Discharging Treated Coal And Controlling Emissions From A Heavy Oil Spray System" issued Oct. 15, 1985 to James L. Skinner.

While the apparatus disclosed in U.S. Pat. No. 4,396,395 has been found to be effective in the treatment of particulate coal with heavy oil, there are two potential problems with the disclosed apparatus. As discussed previously, the disclosed apparatus does not address the problem of escaping exhaust gas carrying entrained heavy oil mist and the apparatus contemplates the use of a baffle/cascade system to apply the heavy oil as an atomized spray. As a result the oil spray, if it does not directly contact a falling coal particle, can hit and adhere to the walls, baffles, and the like of the vessel causing a build up of heavy oil on the inner surfaces of the vessel which could eventually cause the apparatus to plug.

As a result, a continuing effort has been directed to the development of an apparatus which reduces the tendency of the heavy oil to accumulate on the inner surfaces of the contacting vessel. According to the present invention, such a reduced tendency for heavy oil to accumulate on the inner surfaces of the contacting vessel is accomplished by an apparatus for intimately contacting particulate solids with a heavy liquid comprising:

(a) a contacting vessel;
(b) a particulate solids inlet means in communication with an upper end of the contacting vessel and positioned to discharge a stream of particulate solids downwardly into the upper end of the contacting vessel;
(c) a generally conical deflector means having an outer diameter less than an inner diameter of said contacting vessel and positioned in the contacting vessel and beneath the particulate solids inlet to deflect the stream of the particulate solids outwardly over an outer diameter of the deflector means;
(d) an inlet control means operatively associated with the particulate solids inlet means to control the flow of the particulate solids into the contacting vessel and prevent the discharge of gaseous materials from the contacting vessel through the particulate solids inlet means;
(e) a particulate solids outlet means in communication with the lower end of the contacting vessel and positioned to discharge a stream of particulate solids from the contacting vessel;
(f) an outlet control means operatively associated with the particulate solids outlet means to control the flow of particulate solids from the contacting vessel so that a bed of particulate solids is maintained in a lower portion of the contacting vessel so that gaseous materials are exhausted from the contacting vessel through the bed of particulate solids; and,
(g) spray means positioned in the contacting vessel to spray the heavy liquid onto the particulate solids as the particulate solids fall downwardly to the bed of particulate solids, the spray means being positioned so that no spray is directed toward the inner walls of the contacting vessel.

In the discussion of the Figures, the same numbers will be used to refer to the same or similar components in all instances.

Figure 1:
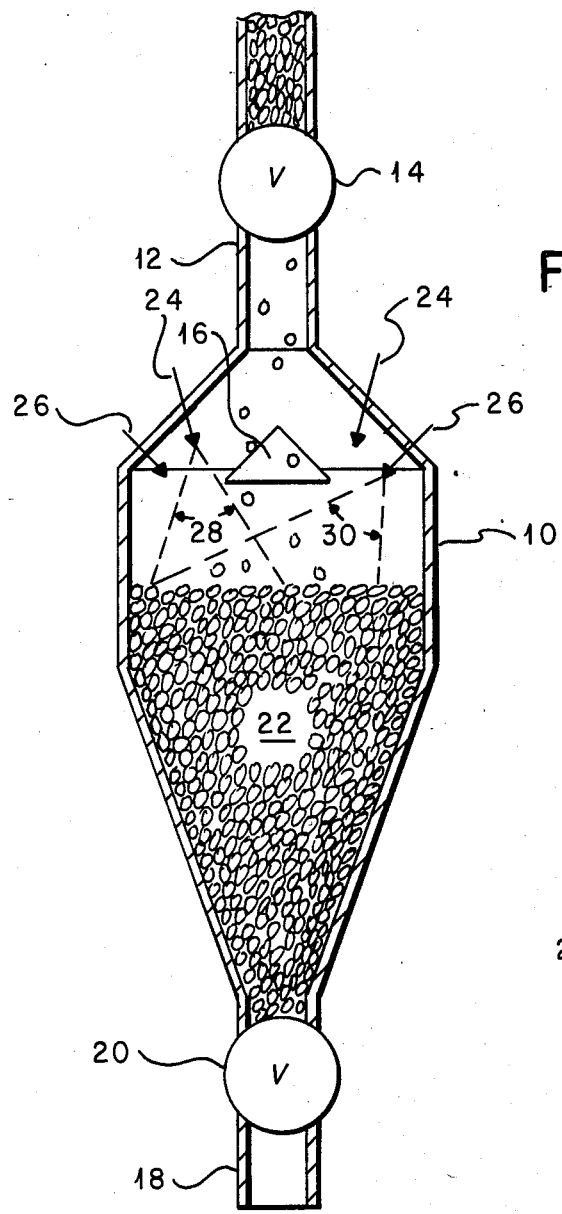
FIG. 1 is a schematic diagram of an embodiment of the apparatus of the present invention.

In FIG. 1 a contacting vessel 10 is shown. Particulate solids to be treated in vessel 10 are charged to vessel 10 through an inlet 12 which includes a control means 14 for regulating the flow of particulate solids into vessel 10. Desirably, control means 14 is a metering valve such as a star feeder or the like which permits the flow of particulate solids through line 12 into vessel 10 at a controlled rate while preventing the escape of exhaust gases from vessel 10 through line 12. A deflector 16 is positioned in vessel 10 and generally directly beneath the discharge from inlet 12. Deflector 16 is a generally cone shaped member which may be supported in position by any convenient means such as by support members in contact with the inner walls of vessel 10 or the like. Suitable methods for supporting deflector 16 are considered to be well within the skill of those in the art and no novelty is considered to reside in the particular method chosen for mounting deflector 16. An outlet 18 shown as line 18 in FIG. 1, is provided for the discharge of treated particulate solids from vessel 10. The flow of particulate solids from vessel 10 is desirably regulated to maintain a bed of particulate solids 22 in vessel 10. Desirably the bed of particulate solids is maintained at a level to be discussed hereinafter. The bed of particulate solids maintained in vessel 10 serves to filter the exhaust gases discharged from vessel 10 by passing the discharged gaseous materials downwardly through bed 22 and out of vessel 10 via line 18. The level of bed 22 in vessel 10 may be maintained by the use of a loosely fitted metering valve 20 such as a star valve adapted to permit the flow of gaseous material therethrough, the use of a throttle plate or the use of a belt conveyor positioned beneath a discharge chute positioned on the bottom of vessel 10 as disclosed in U.S. Pat. No. 4,547,198.

Figure 3:
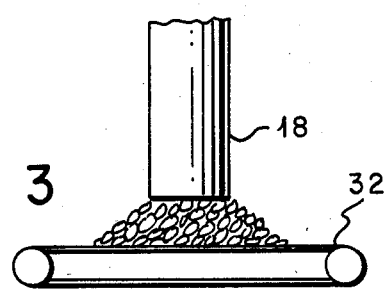
FIG. 3 is a schematic diagram of an embodiment of a method of controlling the discharge of particulate solids from the apparatus shown in FIG. 1.

FIG. 3 is a schematic diagram of an embodiment of the use of such a conveyor belt. Discharge 18 is positioned a short distance above a conveyor belt 32 which is of a width suitable to maintain particulate solids in discharge 18 and vessel 10 above belt 32 as a result of the angle of repose of the particulate solids. The belt should be of a sufficient width to prevent the spillage of particulate solids over the sides of the belt and the rate of withdrawal of particulate solids from vessel 10 is determined by the rate at which belt 32 is passed beneath discharge 18.

A plurality of spray nozzles 24 and 26 are positioned in the upper portion of vessel 10 to spray a heavy liquid such as a heavy oil onto the particulate solids charged to vessel 10 through inlet 12.

Figure 2:
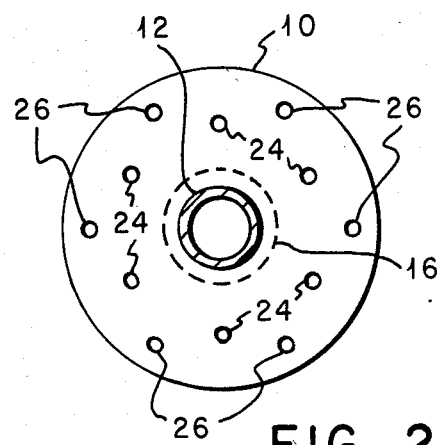
FIG. 2 is a top view of the apparatus shown in FIG. 1.

In the operation of vessel 10, particulate solids are charged to vessel 10 through inlet 12 and passed downwardly into vessel 10 where the particulate solids fall onto the surfaces of deflector 16 and pass outwardly over the outer diameter of deflector 16 and fall into bed 22. Spray nozzles 24 and 26 are positioned to spray a heavy liquid directly onto the falling particulate solids. Desirably at least two sets of spray nozzles are used. As shown in FIG. 2, it is desirable that an outer set 26 of spray nozzles and an inner set 24 of spray nozzles be used. The use of at least two sets of spray nozzles allows the removal of one set of spray nozzles at selected intervals for cleaning, replacement and the like without disruption of treating operations. Spray nozzles 26 are selected and oriented to spray a cone pattern 30 of spray onto the falling particulate solids. It will be noted that pattern 30 does not result in the spraying of heavy liquid onto either the walls of vessel 10 or deflector 16. In the event that there is overspray, i.e. not all the sprayed heavy liquid strikes the particulate solids, the overspray strikes the surface of bed 22. As a result, the heavy liquid all strikes particulate solids. The level of bed 22 is desirably maintained at a level such that the spray pattern from each of the sets of spray nozzles strikes the surface of bed 22. Similarly, sprays 24 are selected and adjusted to spray a cone pattern 28 which is similar to the cone pattern 30 sprayed by spray nozzles 26. In neither instance is the heavy liquid spray directed so that it strikes either deflector 16 or the inner walls of vessel 10 if it does not hit a solid particle. In either instance, the heavy liquid hits particulate solids eventually either in the falling stream of particulate solids or in bed 22. The presence of bed 22 also results in filtration of the discharged gases from vessel 10. As noted previously, when spraying heavy liquids, it is frequently necessary or desirable that carrier gas be used. While not shown, it is also frequently necessary to heat such heavy liquids to obtain a suitable viscosity for spraying.

As discussed above, the use of the apparatus set forth is effective to contact particulate solids with a heavy liquid with a greatly reduced tendency of the heavy liquid to build up on the inner walls of contacting vessel 10. As a result, the risk of heavy liquid accumulation and possible plugging of the vessel 10 is greatly reduced.

As previously indicated, the apparatus of the present invention is particularly well adapted to the treatment of dried low grade particulate coal with heavy oil. Any suitable heavy oil can be used with some suitable heavy oils having been disclosed in U.S. Pat. No. 4,201,657 and U.S. Pat. No. 4,402,707 previously incorporated by reference. These oils are illustrative of suitable oils but the invention is by no means limited to such oils although heavy oils are a preferred treating material for the treatment of dried particulate low rank coals.

Having thus described the invention by reference to its preferred embodiments, it is pointed out that the embodiments described are illustrative rather than limiting in nature and that many variations and modifications are possible within the scope of the present invention. Many such variations and modifications may be considered obvious and desirable based upon a review of the foregoing description of preferred embodiments.

Having thus described the invention, we claim:

1. An apparatus for intimately contacting particulate solids with a heavy liquid, said apparatus comprising:
    (a) a contacting vessel;
    (b) a particulate solids inlet means in communication with an upper end of said contacting vessel and positioned to discharge a stream of said particulate solids downwardly into said upper end of said contacting vessel;
    (c) a generally conical deflector means having an outer diameter less than an inner diameter of said contacting vessel and positioned in said contacting vessel and beneath said particulate solids inlet to deflect said stream of said particulate solids outwardly over an outer diameter of said deflector means;

(d) an inlet control means operatively associated with said particulate solids inlet means to control the flow of particulate solids into said contacting vessel and prevent the discharge of gaseous materials from said contacting vessel through said particulate solids inlet means;

(e) a particulate solids outlet means in communication with the lower end of said contacting vessel and positioned to discharge a stream of particulate solids from said contacting vessel;

(f) an outlet control means comprising a loosely fitted monitoring valve operatively associated with said particulate solids outlet means to control the flow of said particulate solids from said contacting vessel so that a bed of said particulate solids is maintained in a lower portion of said contacting vessel so that gaseous materials are exhausted from said contacting vessel through said bed of said particulate solids; and, (g) spray means for the injection of a spray of dispersed heavy liquid and a carrier gas positioned in said contacting vessel to spray said dispersed heavy liquid onto said particulate solids as said particulate solids fall downwardly to the bed of said particulate solids, said spray means being positioned so that no spray is directed toward the inner walls of said contacting vessel.

2. The apparatus of claim 1 wherein said heavy liquid is a heavy oil.

3. The apparatus of claim 2 wherein gaseous material is used to finely disperse said heavy oil.

4. The apparatus of claim 1 wherein said spray means comprise a plurality of spray nozzles positioned so that no spray is directed toward said deflector means or said inner walls of said contacting vessel.

5. The apparatus of claim 1 wherein said spray nozzles are positioned above the bottom of said deflector means.

6. The apparatus of claim 4 wherein said spray means comprises at least two sets of spray nozzles.

7. The apparatus of claim 1 wherein said outlet control means comprises a discharge chute positioned to receive particulate solids from said contacting vessel in combination with a conveyor belt positioned beneath said discharge chute so that a bed of particulate solids is maintained in said contacting vessel with particulate solids being removed at a desired rate by controlled operation of said conveyor belt.

8. An apparatus for intimately contacting particulate solids with a heavy liquid, said apparatus comprising:

(a) a contacting vessel;

(b) a particulate solids inlet means in communication with an upper end of said contacting vessel and positioned to discharge a stream of said particulate solids downwardly into said upper end of said contacting vessel;

(c) a generally conical deflector means having an outer diameter less than an inner diameter of said contacting vessel and positioned in said contacting vessel and beneath said particulate solids inlet to deflect said stream of said particulate solids outwardly over an outer diameter of said deflector means;

(d) an inlet control means operatively associated with said particulate solids inlet means to control the flow of particulate solids into said contacting vessel and prevent the discharge of gaseous materials from said contacting vessel through said particulate solids inlet means;

(e) a particulate solids outlet means in communication with the lower end of said contacting vessel and positioned to discharge a stream of particulate solids from said contacting vessel;

(f) an outlet control means comprising a throttle plate operatively associated with said particulate solids outlet means to control the flow of said particulate solids from said contacting vessel so that a bed of said particulate solids is maintained in a lower portion of said contacting vessel so that gaseous materials are exhausted from said contacting vessel through said bed of said particulate solids; and, (g) spray means for the injection of a spray of dispersed heavy liquid and a carrier gas positioned in said contacting vessel to spray said dispersed heavy liquid onto said particulate solids as said particulate solids fall downwardly to the bed of said particulate solids, said spray means being positioned so that no spray is directed toward the inner walls of said contacting vessel.

* * * * *